(No Model.)
S. A MARKER.
SINK.
No. 412,195. Patented Oct. 1, 1889.
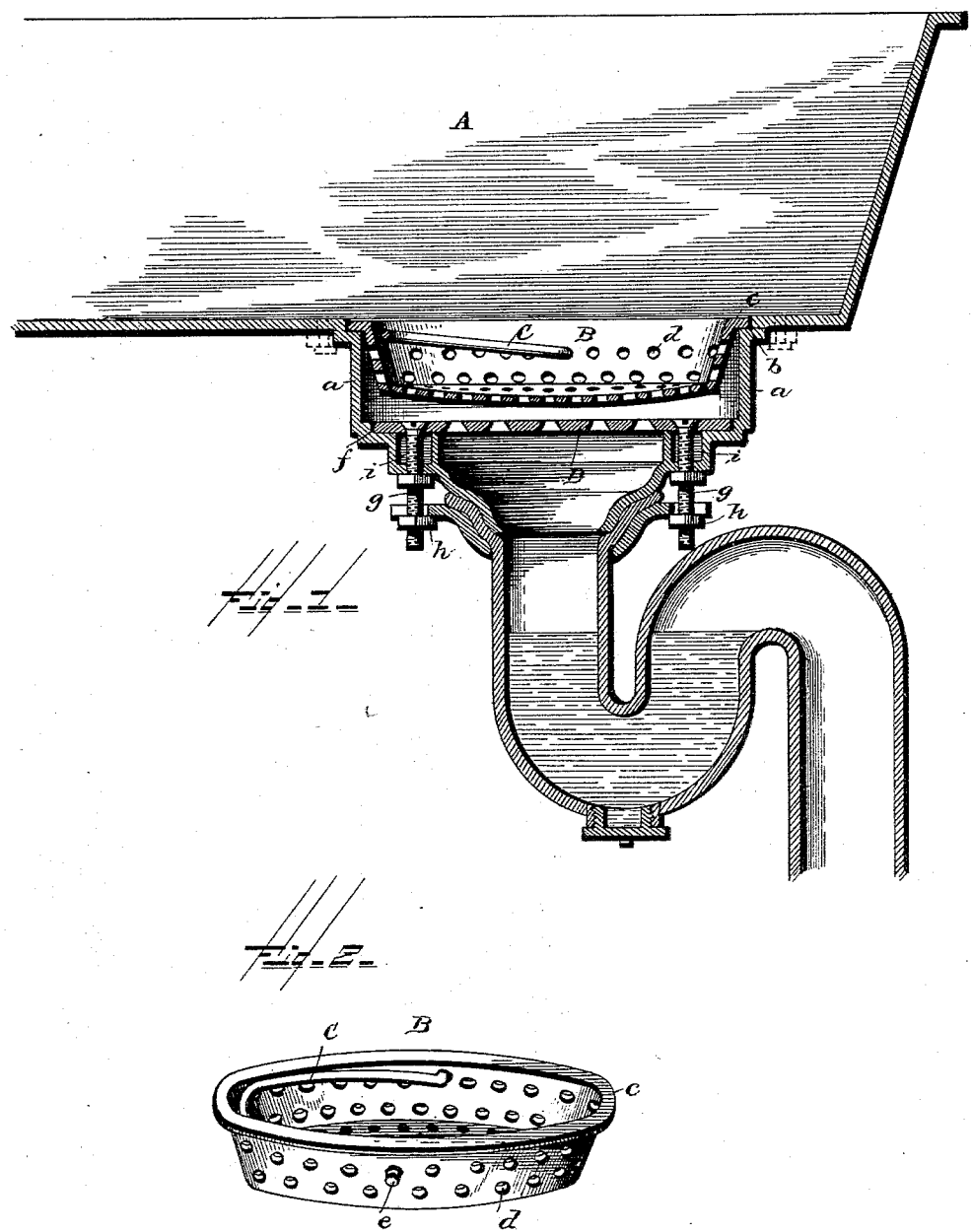

UNITED STATES PATENT OFFICE.

STEPHEN A. MARKER, OF NEWARK, NEW JERSEY, ASSIGNOR OF ONE-HALF TO CHARLES E. BOND, OF SAME PLACE.

SINK.

SPECIFICATION forming part of Letters Patent No. 412,195, dated October 1, 1889.

Application filed June 26, 1889. Serial No. 315,604. (No model.)

*To all whom it may concern:*

Be it known that I, STEPHEN A. MARKER, a citizen of the United States, residing at Newark, in the county of Essex and State of New Jersey, have invented certain new and useful Improvements in Sinks; and I do hereby declare that the following is a full, clear, and exact description of the same, reference being had to the annexed drawings, making a part of this specification, and to the letters of reference marked thereon.

This invention relates to certain new and useful improvements in sinks; and it has for its object to provide for the removal of the refuse which shall accumulate therein without soiling the hands.

The invention consists in the peculiar combinations and the construction, arrangement, and adaptation of parts, all as more fully hereinafter described, shown in the drawings, and then particularly pointed out in the appended claims.

The invention is clearly illustrated in the accompanying drawings, which, with the letters of reference marked thereon, form a part of this specification, and in which—

Figure 1 is a vertical section through a portion of a sink provided with my improvements. Fig. 2 is a perspective view of the removable strainer detached.

Referring now to the details of the drawings by letter, A designates a portion of a sink of any suitable material and size and shape. It is formed with a downwardly-extending portion $a$, which at its upper end has an annular shoulder $b$, on which is designed to rest the upper or removable strainer B. This strainer is formed with an annular rim or flange $c$, which rests on the shoulder on the portion $a$ of the sink, and is formed with a concave bottom and sloping sides, said bottom and sides being provided with a plurality of perforations $d$, for the purpose of allowing the liquid to pass through, while the refuse is retained in said strainer.

C is a bail by which said strainer may be readily removed when necessary. This bail is formed with ends $e$, designed to enter any of the perforations in the strainer, (see Fig. 2,) and is made of springy material, so that its position may be readily changed to best suit it to the location of the strainer, where it will be most convenient. This bail when not in use is adapted to be folded or turned down within the strainer out of the way, as shown in Fig. 2.

D is a strainer seated in a recess $f$ in the portion $a$ of the sink and retained therein preferably by means of the bolts $g$ and nuts $h$, which serve also to secure to said extension the waste-pipe by means well known and such as shown in Fig. 1. These bolts pass through chambers $i$, so as to be protected from the water in the sink as it passes to the waste-pipe.

Instead of forming the portion $a$ integral with the bottom of the sink it may be formed separate and attached thereto in any suitable manner, as shown in Fig. 1 by dotted lines.

It will be seen that by the above construction there are two strainers employed, so that when the upper one is removed for the purpose of removing therefrom the refuse the lower strainer will be in place to catch any refuse that might flow from the sink, and thus the waste-pipe is prevented from being stopped up.

By arranging the removable strainer in the position shown—that is, out of the waste-pipe—the size of the strainer is not restricted to the size of the waste-pipe, as is the case where the strainer has been located within the upper end of the waste-pipe.

By perforating the upper strainer on the sides as well as the bottom the liquid matter will run out through the perforations until the strainer becomes full, whereas where the holes are in the bottom only the refuse covers the holes and the strainer will remain partially full of water.

What I claim as new is—

1. The combination, with the downwardly-extending portion $a$, having an annular shoulder $b$, of the removable strainer B, having perforations in its sides and bottom, and the bail C, formed of springy material, provided with oppositely-extending lateral arms $e$, designed to engage side perforations in the strainer and to be sprung into place therein and to fold within the strainer, substantially as described.

2. The combination, with the downwardly-extending portion $a$, formed with annular depressions $f$ and $b$ and chamber $i$, of the removable strainer B, having an annular flange $c$ resting in the depression $b$, and the strainer D, seated in the depression $f$ in the said portion $a$ below the strainer B and resting on the inner wall of the chamber $i$, and the bolts $g$, passed through holes in said strainer and through said chamber $i$ and provided with suitable nuts, substantially as and for the purpose specified.

In testimony that I claim the above I have hereunto subscribed my name in the presence of two witnesses.

STEPHEN A. MARKER.

Witnesses:
ATWOOD L. DE COSTER,
JOHN H. MEEKER, Jr.